United States Patent
Dillinger et al.

(10) Patent No.: US 7,818,605 B2
(45) Date of Patent: Oct. 19, 2010

(54) METHOD OF MANAGING RECONFIGURABLE TERMINALS WITHIN A RADIO NETWORK

(75) Inventors: Markus Dillinger, Oberhaching (DE); Christoph Niedermeier, München (DE); Reiner Schmid, München (DE)

(73) Assignee: Siemens Aktiengesellschaft, Munich (DE)

( * ) Notice: Subject to any disclaimer, the term of this patent is extended or adjusted under 35 U.S.C. 154(b) by 948 days.

(21) Appl. No.: 10/594,889

(22) PCT Filed: Feb. 23, 2005

(86) PCT No.: PCT/EP2005/050760

§ 371 (c)(1),
(2), (4) Date: Jan. 10, 2007

(87) PCT Pub. No.: WO2005/096653

PCT Pub. Date: Oct. 13, 2005

(65) Prior Publication Data

US 2008/0178036 A1    Jul. 24, 2008

(30) Foreign Application Priority Data

Apr. 2, 2004   (DE) ............... 10 2004 016 381

(51) Int. Cl.
    *G06F 11/00*   (2006.01)
(52) U.S. Cl. ............. 714/4; 455/405; 455/425; 455/418
(58) Field of Classification Search ............ 714/4; 455/418, 405, 425
    See application file for complete search history.

(56) References Cited

U.S. PATENT DOCUMENTS

| | | | |
|---|---|---|---|
| 6,947,735 B2 | 9/2005 | Jung et al. | |
| 6,981,251 B1 | 12/2005 | Kreller et al. | |
| 2002/0006791 A1* | 1/2002 | Nyholm | 455/423 |
| 2004/0071117 A1 | 4/2004 | Jung et al. | |

FOREIGN PATENT DOCUMENTS

| | | |
|---|---|---|
| DE | 102 15 746 A1 | 11/2003 |
| EP | 1 239 688 A1 | 9/2002 |
| EP | 1 263 249 A1 | 12/2002 |
| WO | WO 96/24230 A1 | 8/1996 |
| WO | WO 01/13224 A2 | 2/2001 |
| WO | WO 02/51030 A1 | 6/2002 |

* cited by examiner

*Primary Examiner*—Sam Rizk
(74) *Attorney, Agent, or Firm*—Staas & Halsey LLP

(57) ABSTRACT

A respective agent platform in network elements and producer-specific agents that are installed directly on platform or by way of agent proxies of agent providers. The agents then receive raw information on arising operating errors by way of a defined interface of the agent platform, and, together with producer-specific information on the respective terminals or types of terminal that are known only to the respective producer, from corresponding compressed decision information for evaluating cases of error and/or for optimizing reconfiguration decisions. The agents then provide the information for the network element or the network operator and/or the agent provider or the terminal producer, via the defined interface. This leads to a higher reliability of the interoperability of terminals and network elements in mobile radio networks including reconfigurable terminals.

3 Claims, 1 Drawing Sheet

METHOD OF MANAGING RECONFIGURABLE TERMINALS WITHIN A RADIO NETWORK

PRIORITY STATEMENT

This application is the national phase under 35 U.S.C. §371 of PCT International Application No. PCT/EP2005/050760 which has an International filing date of Feb. 23, 2005, which designated the United States of America and which claims priority on German Patent Application number 10 2004 016 381.2 filed Apr. 2, 2004, the entire contents of which are hereby incorporated herein by reference.

FIELD

The invention generally relates to methods, network elements, and/or components for mobile-radio networks having reconfigurable terminals in which a new, hitherto unsupported radio technology is employed, for example by replacing software that configures the terminal's transceiver.

BACKGROUND

Developing a new technology and using it in mobile telecommunication networks requires much effort in order to make sure the individual components will interact smoothly. That is conventionally achieved by way of costly standardizing—see for example GSM or UMTS—and by testing the individual components. That applies particularly to the network elements' interoperation with the terminals. However, a terminal's use of radio technologies is in the case of present-day terminals, restricted to a precisely defined possible range because using a radio technology means employing respectively special hardware for the respective radio technology.

In contrast to this, in the case of reconfigurable terminals or, as the case may be, software-defined radio devices a software-programmable transceiver allows a new, hitherto unsupported radio technology to be used by replacing the software that configures the transceiver. New radio technologies and standards can therefore be used simply by downloading software onto the terminal, meaning that even existing terminals are able to use new technologies in the radio domain later.

The present UMTS standard for example places stringent demands on the terminals, resulting, inter alia, in some manufacturers' already taking a "UMTS Lightweight" standard into consideration which, though less complex, nevertheless delivers the same performance in certain situations as the original standard. One of the associated prerequisites, though, is for not only the terminal but also the base station involved to be able to interpret the modified standard.

It is no longer guaranteed, though, through the new technology for terminals that interacting of the terminals such as, for instance, cell phones, with a base station or the other components in the network, can be fully tested. The terminals' reconfigurability can, even with utmost care being taken, give rise to disruptions resulting from software downloading. These can be due to faults in the applied software itself that can be ascribed to not being able to adequately test interacting with the network components for the devices.

SUMMARY

On the one hand, an embodiment of the invention includes a method for detecting faults and supporting reconfiguration decisions in mobile-radio networks having reconfigurable terminals and, on the other, an embodiment of the invention includes corresponding network elements and agents by which greater reliability can be achieved in the interoperability of terminals and network elements in mobile-radio networks that support reconfigurable terminals.

At least one embodiment of the invention relates essentially to a respective agent platform in network elements as well as to manufacturer-specific agents installed on said platforms either directly or via agent providers, agent proxies, with the agents then receiving raw information about occurring operational faults via a defined interface of the agent platform and, together with manufacturer-specific information relating to the respective terminals or, as the case may be, types of terminal that is known only to the respective manufacturer, forming corresponding compressed decision information for evaluating fault incidents and/or optimizing reconfiguration decisions, and making the information available to the network element or, as the case may be, network operator and/or agent provider or, as the case may be, terminal manufacturer over the defined interface. That will result in greater reliability in the interoperability of terminals and network elements in mobile-radio networks having reconfigurable terminals.

BRIEF DESCRIPTION OF THE DRAWINGS

The invention is explained in more detail below with the aid of example embodiments shown in the drawings.

DETAILED DESCRIPTION OF THE EXAMPLE EMBODIMENTS

Figure 1:
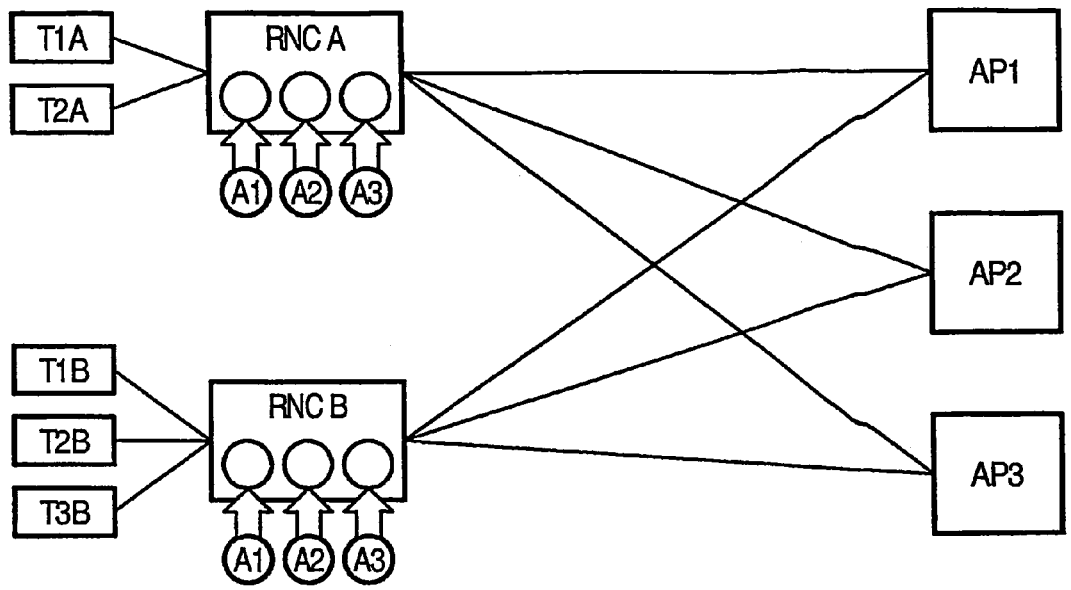
FIG. 1 is a presentation for explaining a first example embodiment of the invention.

FIG. 1 shows agent-enabled network elements in a radio-access network, with one network element in the form of a radio-network controller, or RNC RNCA, being connected or, as the case may be, connectable to two terminals T1A and T2A, and a further network element in the form of a radio-network controller RNCB being connected or, as the case may be, connectable to three terminals T1B, T2B, and T3B, and being in each case supplied by agent providers AP1, AP2, and AP3 directly or, as the case may be, immediately with agents A1, A2, and A3. In this case the agent-enabled nodes are thus the RNCs of a UMTS. In other technologies these can be employed in network elements having an analogous function. For example in Wireless LAN (WLAN) networks, use in the WLAN access points will constitute an analogous use of said kind.

The agents exchange data directly with the respective agent provider, which is to say as a rule with the actual manufacturer or with a service provider. That, though, requires all the agents' application sites to be known directly to the agent provider. So the agent provider needs to know on which RNCs its agents have been installed.

Over defined interfaces of an agent platform of the network element the agents A1, A2, and A3 receive raw information needed for evaluating fault incidents as well as for optimized decision-making in terms of terminal reconfiguring. Said information is processed or, as the case may be, compressed into decision information inside the component.

Figure 2:
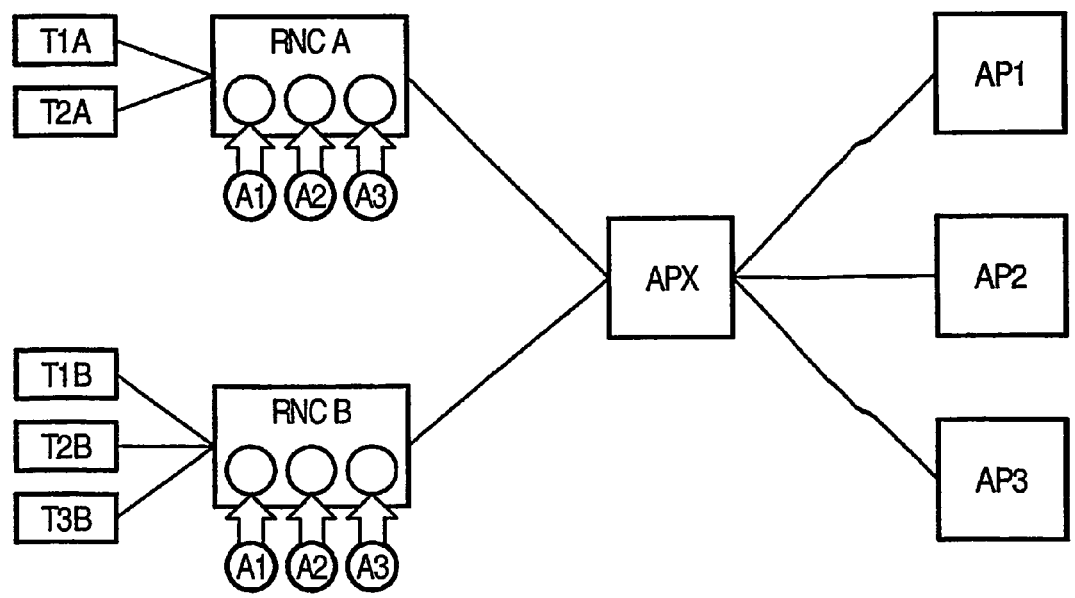
FIG. 2 is a presentation for explaining a second example embodiment of the invention.

FIG. 2 likewise shows agent-enabled network elements in a radio-access network which differ from those shown in FIG. 1 only in that the RNCs RNCA and RNCB are supplied with agents A1, A2, and A3 not directly but via an agent proxy APX of the agent providers AP1, AP2, and AP3. An agent proxy APX mediates communication between the RNCs on which agents have been installed with their providers, with the agent proxy constituting a central location which the network elements access and which assumes the managing of which agent provider will supply the desired information. The providers AP1, AP2, and AP3 can in their turn send requests and messages for their agents A1, A2, and A3 directly to the agent proxy APX, which distributes the messages among the agents concerned. During installing or, as the case may be, uninstalling, the RNCs on which specific manufacturers' agents have been installed are registered on the agent proxy APX so that the individual agents A1, A2, and A3 on the RNCs RNCA and RNCB can be addressed via the proxy APX.

The network elements in mobile-radio networks, for example RNCs, are equipped with areas or, as the case may be, agent platforms for agents of the kind, with the platforms assuming, for instance, the allocating of computing time for the agents and the controlling thereof. The area in which the agents run is therein protected such that accessing is possible only by specially authorized users, which is to say by the manufacturer of the respective component. The agent platform is therein embodied such that the agent itself is conveyed encrypted so the software will not be accessible to third parties.

The platform must furthermore authorize itself with the agent to insure that third parties will not be able to use the software. The transmission of data between the agent and respectively usage-authorized manufacturers, which is to say the agent providers, is safeguarded via just such measures so that the data being transmitted will be treated as confidential and can only reach the authorized manufacturer.

The network operator has control over who is able to employ agents on same's network elements, but has no, or only limited, access to the agent's data itself.

Moreover, the network element itself only grants the respectively authorized agent access to the data. Thus, agents can be produced securely, for example by the manufacturer of a specific type of terminal. The agents can then perform functions on the network elements independently without third parties' being able to access the confidential information.

Embodiments of the invention's application are not, however, restricted solely to RNCs; they can further be applied to base transceiver stations (BTS). Through the use of agents, in addition to the example applications cited hitherto, it is possible there to realize manufacturer-specific expansions made to the respective mobile-radio standard. It is herein assumed that manufacturers of mobile-radio terminals will in the future employ their own manufacturer-specific expansions made to the mobile-radio standard in order to provide their devices with additional advantages. These can include reducing the data rate by using a narrower frequency band, as a result of which the mobile-radio cell's existing capacity can be better utilized because more terminals can share a band.

However, the non-standard-compliant terminals require a manufacturer-specific expansion of the functionality of the BTS because this has to support the expansions made to the standard. The functionality can be made available by the terminal manufacturer by providing suitable agents for the BTS. Terminals of the type can as a result be used with any BTS equipped with an agent platform without the BTS manufacturer's having, when designing the BTS, to take account of such expansions made to the standard selectively for specific manufacturers. Neither will the terminal manufacturer have to disclose all details of same manufacturer's-specific expansion because these can be processed by the respectively associated agents on the BTS. The design of the interface of the agent platform having the BTS can furthermore insure that the manufacturer-specific expansions made to the standard will not conflict with the behavior of other mobile-radio users.

Analyzing Faults and Gathering Fault Data

Over defined interfaces of an agent platform the network elements therein makes information available to a manufacturer's agent about faults occurring in connection with the relevant manufacturer's devices. Included here, for instance, are infringements of network protocols, infringements of the radio standard, for example if the terminal uses a frequency range other than that requested or violates time specifications, and other events resulting in network disruption.

However, information about the type of malfunctioning usually arises in the domain of the network operator who, though, not being in possession of the relevant device's full, generally not publicly accessible specifications, is unable to interpret the information adequately. The information is, though, necessary if the network is to operate smoothly. Devices in particular that seriously impair network operation must be identified and, through appropriate measures, prevented from continuing to disrupt network operation. That can be done by, for example, selectively applying bug fixes to the terminal software. That, however, necessitates analyzing the operational data and communicating with the network elements. Conveying all data to the manufacturer would, however, entail an unreasonable amount of communication and include conveying sensitive data about mobile-radio users' behavior. The necessary procedure is, moreover, dependent on the type of terminal used and can be based on information the manufacturer does not wish to disclose.

The agent gathers relevant fault incidents and conveys data or, as the case may be, compressed information about them to the manufacturer. The faults can, moreover, also be analyzed by the agent and necessary decisions taken, for example reconfiguring the terminal into a failsafe default mode, initiating software downloading in order to replace faulty software with a later version, or disabling the terminal if an operationally safe condition cannot be attained. That is achieved using special commands which the agent can send to the terminal. These are safeguarded by authorization codes such that misuse by third parties is precluded.

Support in the Reconfiguration Decision

Such information is, moreover, also needed for decisions/algorithms whose purpose is to take the best possible decision about changing over between radio technologies. It must therefore be provided in a manner allowing the operators of the networks to achieve best possible utilization of their networks without having to make the relevant information known publicly, in particular, though, to manufacturers of network elements (and of the software running thereon). Such information can relate to, inter alia, terminal characteristics such as the terminal's energy consumption in specific radio modes, the duration of reconfiguring, or the transceiver's precise characteristics.

The network element directs an inquiry to the respective manufacturer's agent, which it processes using the data accessible only to it as well as the information supplied as part of the inquiry by the network element. In response to the inquiry the agent sends the network element a recommendation that can be used to optimize the flows in the network. Configuration parameters of reconfigurable terminals as well as manufacturer-specific reconfiguration mechanisms are thus encapsulated within the agent. Neither the network operator, nor the user of the mobile terminal, nor other device manufacturers have access to the data.

Decisions about optimal reconfiguring are, as already indicated above, partially relocated to manufacturer-specific agents which, using the information made available to them and the manufacturer-specific data known only to them, produce decision proposals which the RNC can take into account.

Advantages

Network elements that are agent-enabled such as, for example, RNCs, access points, and analogous devices, are able to support reconfigurable terminals such as, for instance, mobile telephones, Private Digital Assistants (PDAs), and notebooks significantly better than can network elements of conventional design.

The higher possible fault rate resulting from the flexible programming of the terminals, protocol stack can be better controlled by including manufacturer-specific algorithms/information. In particular, faults that occur can be better detected and interpreted because software provided by the device manufacturer can assume this function. This allows malfunctions to be correctly interpreted and suitable measures initiated such as, for example, disabling or, as the case may be, initiating reconfiguration to faultlessly operating default modes, or recognizing the need to update the software. Moreover, the system can serve to detect sources of faults in the terminal's software early by gathering information about the frequency of faults and their nature and making it available to the manufacturer.

A further improvement in reliability can also be achieved by providing manufacturer-specific fallback actions to be taken in the event of a fault which, despite the presence thereof, also allow normal operation to be continued without updating the terminal's software until a suitable software update is available for the terminal.

A further advantage of at least one embodiment of the invention is to be seen in the improved manner in which decisions about reconfiguring the terminals can be taken. While deciding, the agents can take account of manufacturer's specifics without said details, having to be made known publicly. The technology employed furthermore allows the manufacturer-specific software components to be easily exchanged and replaced with a new one, which in turn allows account to be taken of changes to terminals as well as the introduction of new terminals.

The invention will furthermore allow expansions made to mobile-radio standards to be employed sooner. That means new manufacturer-specific expansions made to existing standards, which expansions can contribute to, for example, improved use of the resources in mobile-radio cells, can in a simple manner be employed in mobile-radio networks equipped with BTSs according to at least one embodiment of the present invention.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method of managing reconfigurable terminals within a radio network, the method comprising:
   supplying one or more agents to a network element within the radio network, the one or more agents being supplied to the network element via one or more respective agent providers;
   providing one or more agent platforms within the network element, the one or more agent platforms being provided for storing a respective agent, each agent platform allowing the respective agent provider to set up an agent having specific access rights, communication between respective agent platforms and agent providers being encrypted;
   receiving, from one or more of the reconfigurable terminals, at the one or more agent platforms, information relating to at least one of fault incidents occurring in the one or more reconfigurable terminals and reconfiguration optimization information of the one or more reconfigurable terminals; and
   processing, by the one or more agents, the information received at the one or more agent platforms in order to produce decision information and providing the decision information to at least one of the respective terminal, the respective agent provider, the network element, an operator of the network, and a manufacturer of the respective terminal,
   wherein decisions about reconfiguration optimization are partially relocated by the network element to manufacturer-specific agents, which, using the information made available to them and manufacturer-specific data, accessible only to the device manufacturer, concerning the respective terminal, produce decision information for the network element, and
   wherein the manufacturer-specific data includes energy consumption of the respective terminal in at least one of specific radio modes, the duration of reconfiguring, and precise characteristics of the respective terminal.

2. The method of claim 1, wherein the network element transfers raw information about operational faults of the respective terminal to a respective agent of the terminal manufacturer and the agent, when requested by the agent provider, supplies decision information formed based on the raw information.

3. The method of claim 2, wherein the decision information contains information about occurring infringements of at least one of a network protocol and a radio standard.

* * * * *